United States Patent
Gunter et al.

(10) Patent No.: US 10,262,134 B2
(45) Date of Patent: Apr. 16, 2019

(54) DETECTION OF KEY LOGGING ACTIVITY

(71) Applicant: International Business Machines Corporation, Armonk, NY (US)

(72) Inventors: Fionnuala G. Gunter, Austin, TX (US); Christy L. Norman Perez, Austin, TX (US); Michael T. Strosaker, Austin, TX (US); George C. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 15/287,894

(22) Filed: Oct. 7, 2016

(65) Prior Publication Data
US 2018/0101679 A1    Apr. 12, 2018

(51) Int. Cl.
*H04L 29/06* (2006.01)
*G06F 21/55* (2013.01)
*G06F 21/83* (2013.01)

(52) U.S. Cl.
CPC ........... *G06F 21/554* (2013.01); *G06F 21/83* (2013.01); *G06F 2221/031* (2013.01); *G06F 2221/0775* (2013.01)

(58) Field of Classification Search
CPC .. G06F 21/554; G06F 21/83; G06F 2221/031; G06F 2221/0775
See application file for complete search history.

(56) References Cited

U.S. PATENT DOCUMENTS

| | | | | |
|---|---|---|---|---|
| 5,305,238 | A | * | 4/1994 | Starr, III ............... G06F 3/021 400/704 |
| 5,696,702 | A | * | 12/1997 | Skinner ................ G06F 11/34 702/178 |
| 7,721,333 | B2 | | 5/2010 | Horne |
| 7,823,201 | B1 | | 10/2010 | Xu |
| 9,703,772 | B2 | * | 7/2017 | Clarke ............ G06F 17/2775 |
| 2006/0190725 | A1 | * | 8/2006 | Huang ............. G06F 11/3438 713/168 |
| 2008/0294909 | A1 | * | 11/2008 | Ostrovsky ........ G06F 17/30516 713/189 |
| 2009/0271866 | A1 | | 10/2009 | Liske |
| 2011/0167375 | A1 | * | 7/2011 | Kocienda ............ G06F 1/3203 715/773 |

(Continued)

OTHER PUBLICATIONS

"Enhanced avoidance of Key-stroke logging spyware." IBM. (Year: 2007).*

(Continued)

*Primary Examiner* — Shawnchoy Rahman
(74) *Attorney, Agent, or Firm* — DeLizio Law, PLLC

(57) ABSTRACT

Detection of a key logger includes determining a count of keystrokes that occur during each of a plurality of time windows. Write activity that occurs during each of the plurality of time windows can be measured. The number of key strokes occurring in window is compared with the write activity occurring during the window. In response to determining that the count of keystrokes in a time window is linearly related to the measurement of write activity in the time window for a threshold number of time windows of the plurality of windows, a notification of a potential presence of a key logger is provided.

20 Claims, 4 Drawing Sheets

(56) References Cited

U.S. PATENT DOCUMENTS

| | | | |
|---|---|---|---|
| 2011/0320816 A1* | 12/2011 | Yao | G06F 21/316 713/171 |
| 2014/0278718 A1* | 9/2014 | Malkin | G06Q 10/1095 705/7.26 |
| 2015/0067763 A1* | 3/2015 | Dalcher | G06F 21/554 726/1 |
| 2016/0098392 A1* | 4/2016 | Clarke | G06F 21/6245 713/168 |

OTHER PUBLICATIONS

Rahman, Khandaker A., Kiran S. Balagani, and Vir V. Phoha. "Making impostor pass rates meaningless: A case of snoop-forge-replay attack on continuous cyber-behavioral verification with keystrokes." Computer Vision and Pattern Recognition Workshops (CVPRW). IEEE, 2011. (Year: 2011).*

* cited by examiner

DETECTION OF KEY LOGGING ACTIVITY

BACKGROUND

Embodiments of the inventive subject matter generally relate to the field of computing systems, and, more particularly, to detecting key logging activity in computing systems.

A key logger is a program that covertly monitors and records a users key strokes on a keyboard. The recorded key strokes can be sent to a third party, or saved for retrieval by a third party. Key loggers can be a particularly nefarious manifestation of malware, because they can enable an attacker to easily gather a large amount of sensitive information without the need to defeat encryption. Besides the ability to collect credentials (username/password combinations) without having to obtain access to (and crack) password databases, they can potentially collect account numbers, transcripts of confidential documents as they are typed, and other sensitive data prior to them being encrypted.

It can be difficult to detect the presence of a key logger on a system. Antivirus and other antimalware products that attempt to detect key loggers typically work by searching for signatures of known malware ("threat signatures"). There is often a lag between the creation of new malware and its appearance in an anti-virus signature database. Further, it is often not difficult for a savvy attacker to disguise the signature to avoid detection. Forensic software may allow for detection of key logging activity in post-mortem memory dumps, but it is infeasible to perform such analysis on a regular or ongoing basis.

SUMMARY

Detection of a key logger includes determining a count of keystrokes that occur during each of a plurality of time windows. Write activity that occurs during each of the plurality of time windows can be measured. The number of key strokes occurring in window is compared with the write activity occurring during the window. In response to determining that a same correlation exists between a count of keystrokes in a time window and the measurement of write activity in the time window for a threshold number of time windows of the plurality of windows, a potential presence of a key logger is determined.

BRIEF DESCRIPTION OF THE DRAWINGS

The present embodiments may be better understood, and numerous aspects of the disclosure made apparent to those skilled in the art by referencing the accompanying drawings.

DESCRIPTION OF EMBODIMENT(S)

The description that follows includes example systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
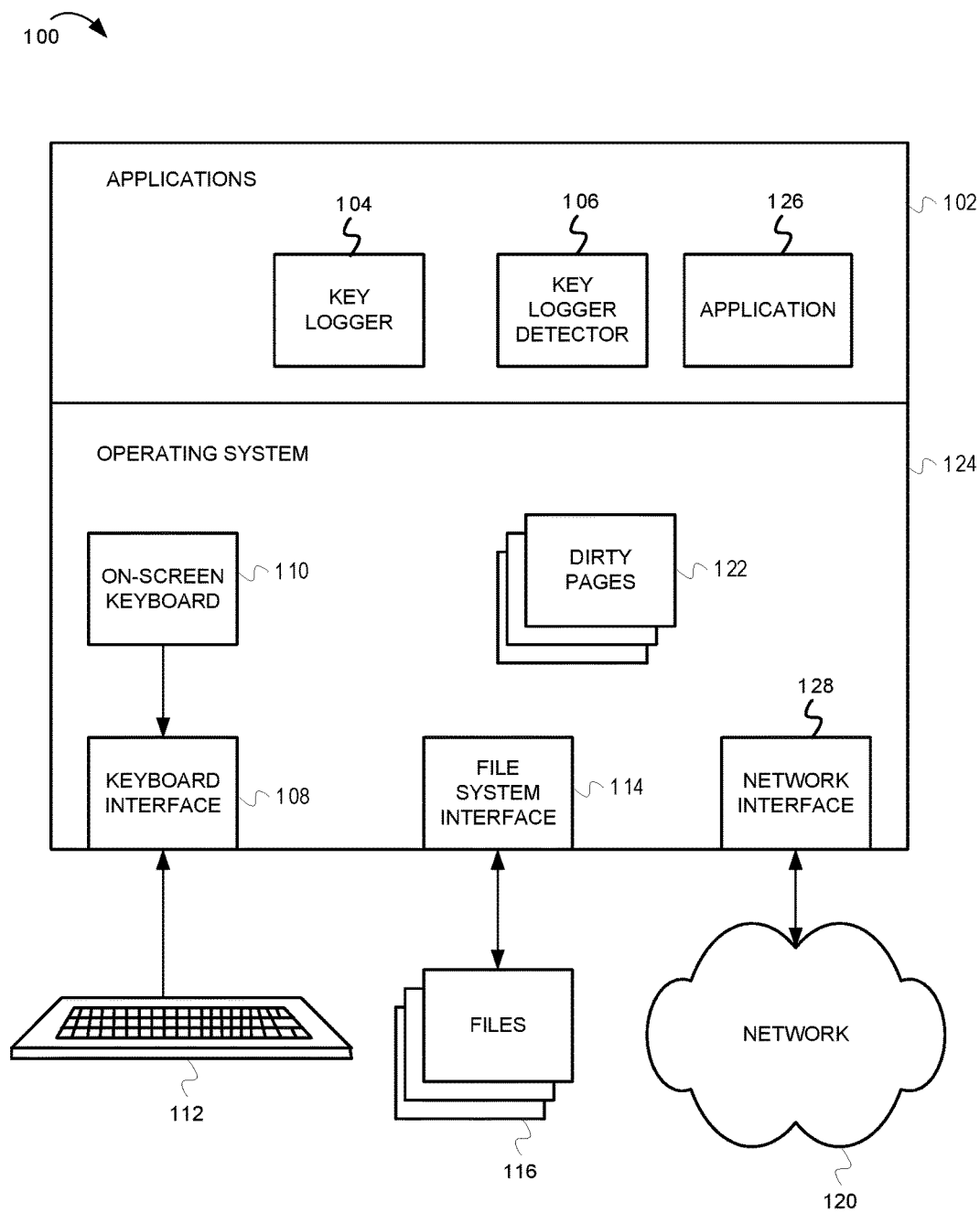
FIG. 1 is a block diagram that depicts a computing system including a key logger according to aspects of the disclosure.

FIG. 1 is a block diagram that depicts a computing system 100 according to aspects of the disclosure. In some aspects, computing system 100 includes an operating system 124 and applications 102. Applications 102 can include key logger 104, key logger detector 106 and application 126.

Key logger 104 is a program designed to capture and record key strokes of a keyboard 112 or on-screen keyboard 110. Various types of key loggers are known in the art. Examples include kernel-based key loggers, API-based key loggers, form based key loggers, and memory injector based key loggers. A kernel-based key logger can be a program on the computing system 100 that obtains root access to intercept keystrokes that pass through the kernel. A kernel based key logger can reside at the operating system level. As a result, a kernel-based key logger can be difficult to detect, especially for user-mode applications that don't have root access. A key logger 104 using this method can act as a key board interface 108 (e.g., a keyboard device driver), and thus gain access to any information typed on the keyboard as it goes to the operating system 124.

API-based key loggers hook keyboard application program interfaces (APIs) inside a running application 126. The key logger 104 can register keystroke events, as if it were a normal piece of the application 126. In this type of implementation, the key logger 104 receives an event each time the user presses or releases a key. The key logger 104 can record the key for later retrieval. In Microsoft Windows based operating systems, APIs such as GetAsyncKeyState( ), GetForegroundWindow( ), etc. can be used to poll the state of the keyboard or to subscribe to keyboard events.

Form grabbing based key loggers obtain key stroke information from form submissions by recording the web browsing on "submit" events. A submit event occurs when a user completes a form within a web browser and submits it, for example, by clicking a button or hitting enter. This type of key logger 104 records form data before it is transmitted over network 120 via network interface 128.

Memory injection based key loggers can alter memory tables associated with a browser or other system functions. By patching the memory tables or injecting directly into memory, this technique can allow the key logger to bypass authorization and authentication mechanisms of the operating system 124.

Key logger detector 106 is a program that implements the novel methods described herein to detect the presence of a key logger 104 on computing system 100. As will be further described below, key logger detector 106 can correlate a count of key strokes that occur in various timing windows with write activity within computing system 100. For example, the count of key strokes may be correlated with write activity to one or more files 116 via file system interface 114. Alternatively, the count of key strokes may be correlated with write activity to a network 120 via network interface 128. Further, the count of key strokes can be correlated with the growth of data in dirty pages 122.

Although shown in FIG. 1 as being at the applications 102 level of privilege, either or both of key logger 104 and key logger detector 106 can be implemented to be included in operating system 124.

Figure 2:
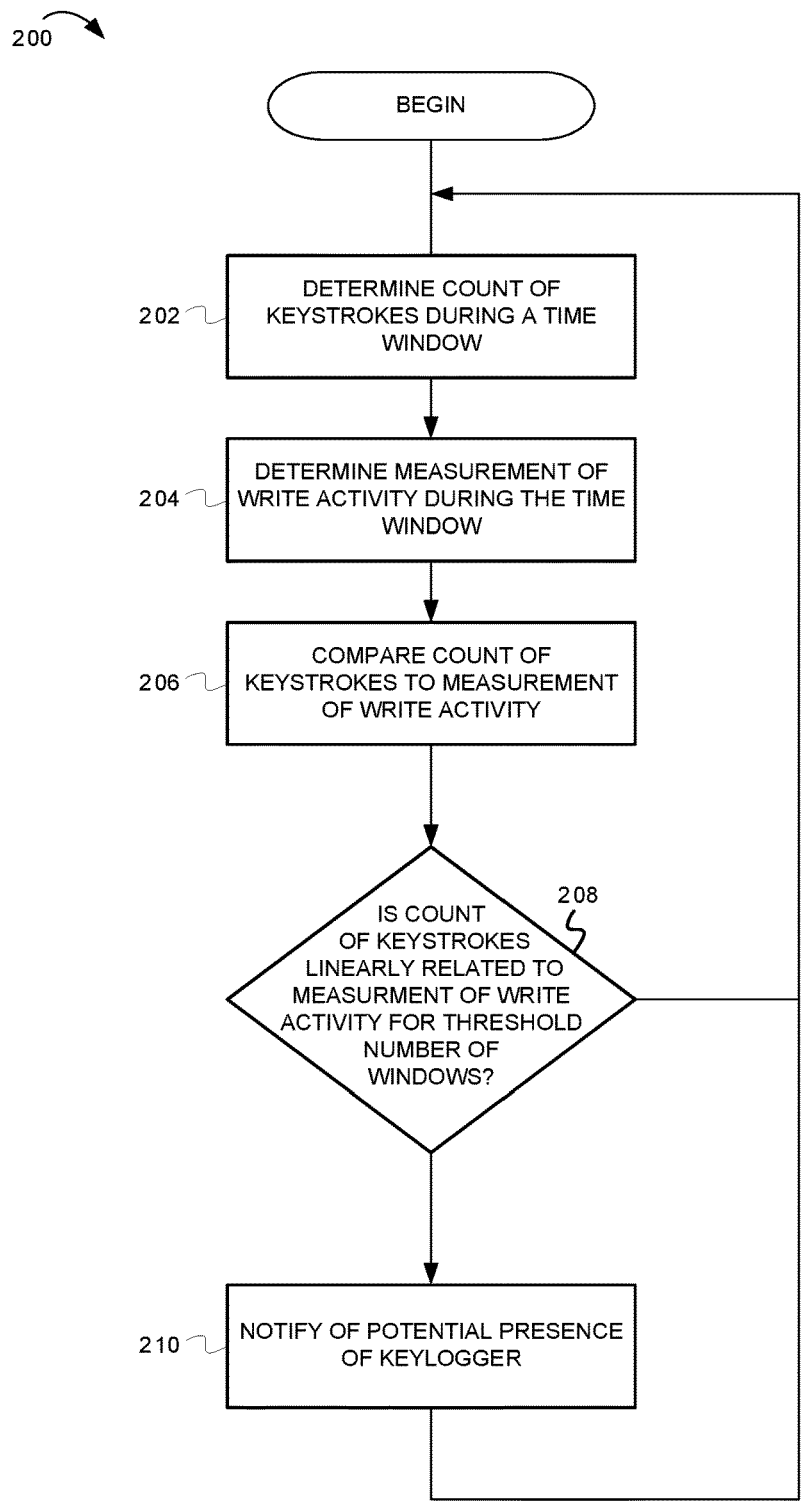
FIG. 2 is a flow chart illustrating a method for detecting the presence of a key logger according to aspects of the disclosure.

FIG. 2 is a flow chart illustrating a method for detecting the presence of a key logger 104 according to aspects of the disclosure.

At block 202, a key logger detector 106 counts the number of key strokes that occur during one or more time windows. A time window can have a duration of n seconds. In some aspects, a value of n can be 60 seconds.

At block 204, key logger detector 106 determines a measurement of write activity occurring during the time window. For example, the key logger detector 106 may determine the size of write operations to one or more individual files that received data during the time window. Further, the key logger detector 106 may determine the size of packets transmitted over a network 120 via a network interface 128. Additionally, key logger detector 106 can determine the size of data in dirty pages that are waiting to be written in a virtual memory system.

At block 206, the measurement of write activity during a series of windows can be compared to the number of key strokes that occurred during the series of windows.

In some aspects, at the end of a time window, a check is made at block 208 to determine if the number of keystrokes occurring over a period of x windows is linearly related to the write activity during the x windows. For example, if the growth of a file or files, the network activity during a window, or the amount of data in dirty pages shows a linear relationship with the count of key strokes in each of the x windows, then at block 210, the system determines the potential presence of a key logger 104. In response to determining the presence of a key logger 104, the key logger detector 106 can perform various actions. For example, the key logger detector 106 may provide a notification to a user or administrator regarding the potential presence of a key logger 104. Further, the key logger detector 106 may disable key logger 104. Additionally, the key logger detector 106 may remove the key logger 104 from system 100, or quarantine the logger 104.

The choice of values for a time windows duration n, and a number of windows x, can be based on a time period that is short enough to detect a key logger 104 before a substantial amount of data has been recorded or sent to an attacker, and long enough to avoid spurious warnings or false positives due to long document editing sessions or chat sessions. For example, it is desirable to choose n and x such that the time period spanned by the windows is long enough such that the number of key strokes would not normally correlate with the increase in file size. In other words, the total time period spanned by the windows should be long enough for a user to likely have entered non-textual characters such as a page-up, page-down, backspace or other cursor control keys. In some aspects, a time window duration n can be 60 seconds, and a number of windows x can be 5. However, those of skill in the art having the benefit of the disclosure will appreciate that other values for n and x may be used and that such values are within the scope of the inventive subject matter.

Figure 3:
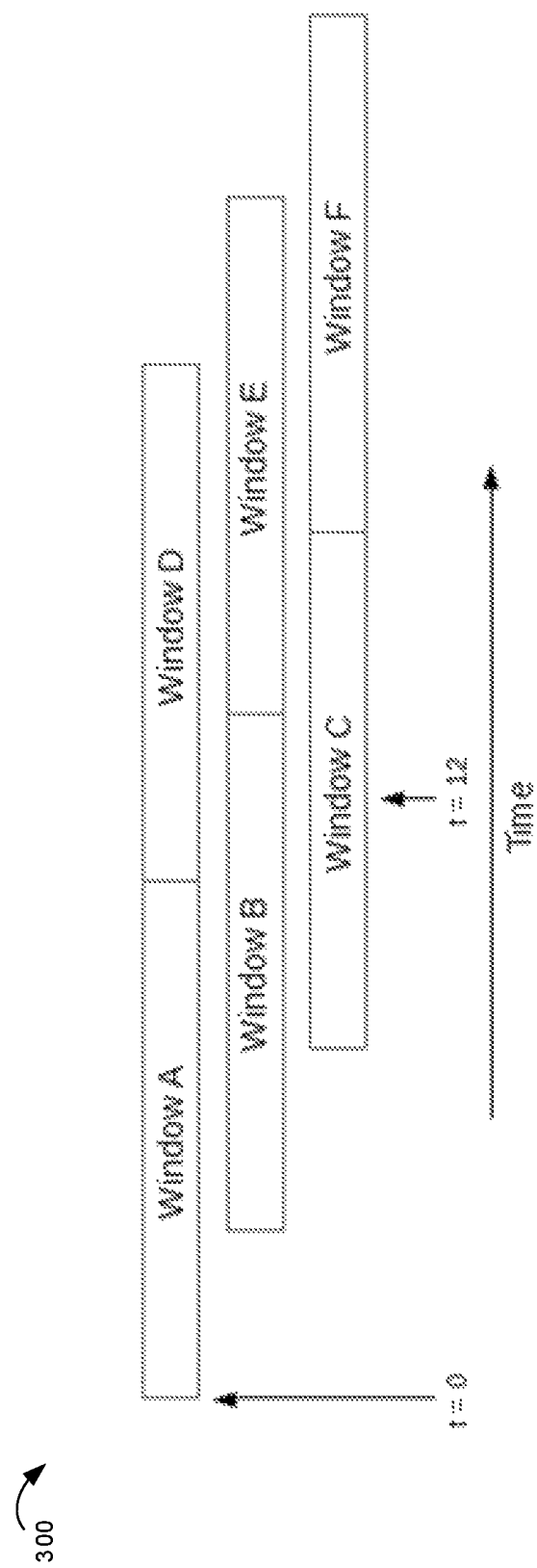
FIG. 3 is a timing diagram this illustrates a configuration of timing windows according to aspects of the disclosure.

FIG. 3 is a timing diagram that illustrates a configuration of timing windows according to aspects of the disclosure. In some aspects, timing windows implemented by key logger detector 106 are configured to overlap. For example, a new time window may be started before a previous time window expires. As a result, multiple windows may overlap with one another. FIG. 3 illustrates an example time period in which six windows are created, windows A-F. As shown in FIG. 3, windows B and C are started before window A expires, and windows E and F are started before window D expires. In some aspects, a key stroke can be counted in each of the windows that have started and have not yet expired when the key stroke occurred. For example, a key stroke occurring at time t=12 shown in FIG. 3 will be counted in three windows, window B, window C and window D. The use of overlapping windows can be beneficial in order to handle spurious correlations. For example, assume a windows size of 30 seconds, and further assume that a user types in one document for approximately 30 seconds then switches to another document and types for approximately 30 seconds. The correlation of key strokes and growth of files in both windows would suggest the potential for logging activity. However, a window that overlapped each would show a lack of correlation between key strokes and the growth of any particular file, and so would negate the prediction of the other two.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C"

programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
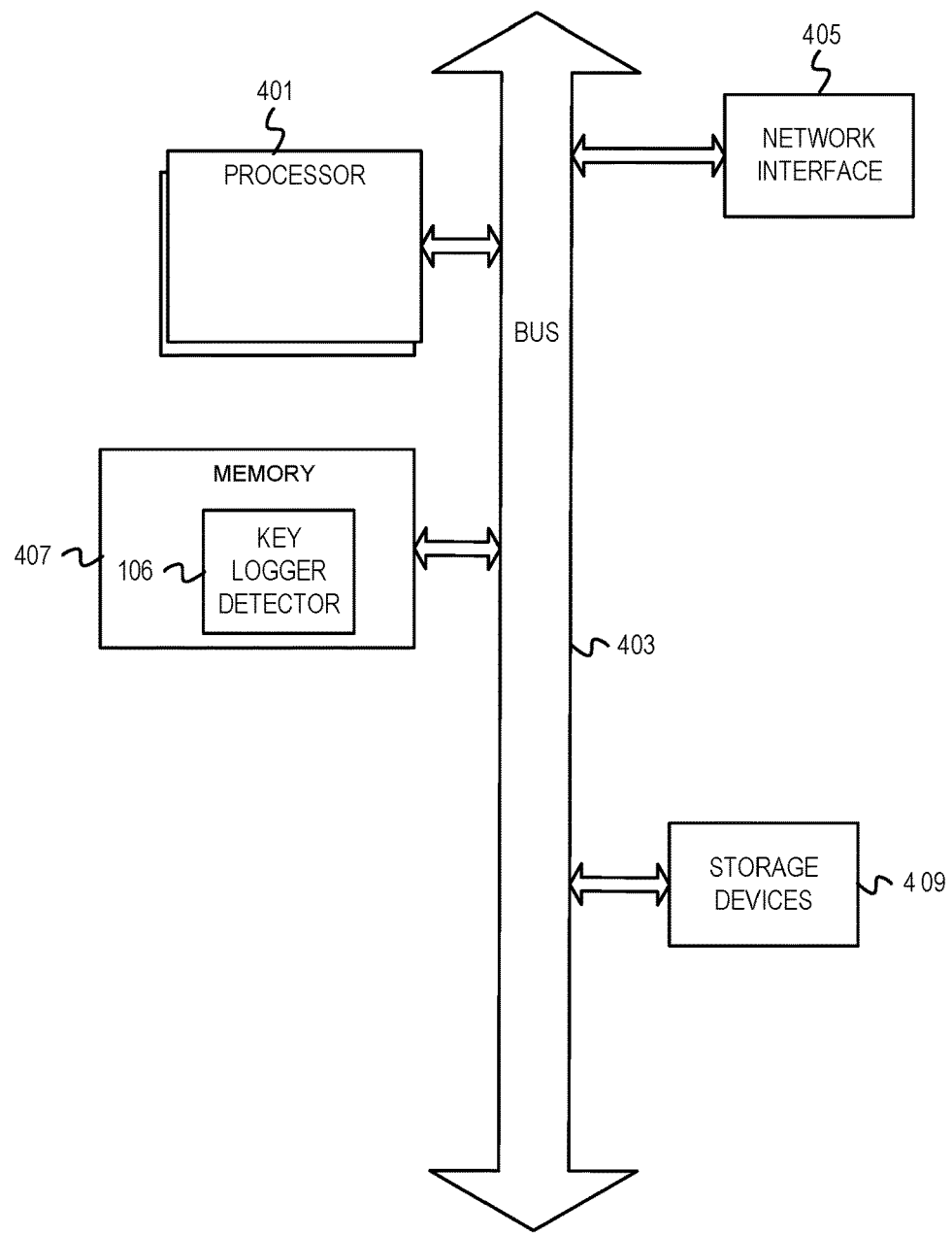
FIG. 4 is a block diagram of an example computer in which embodiments may be implemented.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate detecting the presence of key loggers. Any one of these functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for detecting the presence of key loggers as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for detecting key logging in a computer system, the method comprising:
    determining, via a key logger detector operating via at least one processor of the computer system, a count of keystrokes during each of a plurality of time windows;
    determining, via the key logger detector, a measurement of write activity in the computer system during each of the plurality of time windows;
    for a time window of the plurality of time windows, comparing the count of keystrokes during the time window with the measurement of write activity in the computer system during the time window; and
    in response to determining that a same correlation exists between the count of keystrokes in the time window and the measurement of write activity in the time window for a threshold number of time windows of the plurality of windows, determining, via the key logger detector, a potential presence of a key logger.

2. The method of claim 1, wherein said determining that the same correlation exists between the count of keystrokes in the time window and the measurement of write activity in the time window includes determining that the count of keystrokes is linearly related to the measurement of write activity in the time window for the threshold number of time windows.

3. The method of claim 1, wherein a first time window of the plurality of time windows overlaps with a second time window of the plurality of time windows such that a keystroke is counted in the first time window and the second time window.

4. The method of claim 1, wherein the measurement of write activity comprises a measurement of a size of one or more write operations to one or more files during the time window.

5. The method of claim 1, wherein the measurement of write activity comprises a measurement of network activity during the time window.

6. The method of claim 1, wherein the measurement of write activity comprises measurement of a growth of data in dirty pages during the time window.

7. The method of claim 1, further comprising:
in response to determining a potential presence of a key logger, performing one or more of: providing a notification of the potential presence of the key logger, disabling the key logger, and removing the key logger.

8. A computer program product for detecting key logging comprising a non-transitory computer readable storage medium having program instructions embodied therewith, the program instructions executable by one or more processors, the program instructions including:
instructions to determine a count of keystrokes during each of a plurality of time windows;
instructions to determine a measurement of write activity during each of the plurality of time windows;
instructions to for a time window of the plurality of time windows, compare the count of keystrokes during the time window with the measurement of write activity during the time window; and
instructions to in response to a determination that a same correlation exists between the count of keystrokes in the time window and the measurement of write activity in the time window for a threshold number of time windows of the plurality of windows, determining a potential presence of a key logger.

9. The computer program product of claim 8, wherein said determination that the same correlation exists between the count of keystrokes in the time window and the measurement of write activity in the time window includes a determination that the count of keystrokes is linearly related to the measurement of write activity in the time window for the threshold number of time windows.

10. The computer program product of claim 8, wherein a first time window of the plurality of time windows overlaps with a second time window of the plurality of time windows such that a keystroke is counted in the first time window and the second time window.

11. The computer program product of claim 8, wherein the measurement of write activity comprises a measurement of a size of one or more write operations to one or more files during the time window.

12. The computer program product of claim 8, wherein the measurement of write activity comprises a measurement of network activity during the time window.

13. The computer program product of claim 8, wherein the measurement of write activity comprises measurement of a growth of data in dirty pages during the time window.

14. The computer program product of claim 8, wherein the instructions further comprise:
instructions to in response to a determination of the potential presence of a key logger, perform one or more of: provide a notification of the potential presence of the key logger, disable the key logger, and remove the key logger.

15. An apparatus comprising:
a processor; and
a non-transitory computer readable storage medium communicably coupled to the processor, the computer readable storage medium having stored thereon program instructions comprising:
instructions to determine a count of keystrokes during each of a plurality of time windows;
instructions to determine a measurement of write activity during each of the plurality of time windows;
instructions to for a time window of the plurality of time windows, compare the count of keystrokes during the time window with the measurement of write activity during the time window; and
instructions to in response to a determination that a same correlation exists between the count of keystrokes in the time window and the measurement of write activity in the time window for a threshold number of time windows of the plurality of windows, determining a potential presence of a key logger.

16. The apparatus of claim 15, wherein said determination that the same correlation exists between the count of keystrokes in the time window and the measurement of write activity in the time window includes a determination that the count of keystrokes is linearly related to the measurement of write activity in the time window for the threshold number of time windows.

17. The apparatus of claim 15, wherein a first time window of the plurality of time windows overlaps with a second time window of the plurality of time windows such that a keystroke is counted in the first time window and the second time window.

18. The apparatus of claim 15, wherein the measurement of write activity comprises a measurement of a size of one or more write operations to one or more files during the time window.

19. The apparatus of claim 15, wherein the measurement of write activity comprises a measurement of network activity during the time window.

20. The apparatus of claim 15, wherein the measurement of write activity comprises measurement of a growth of data in dirty pages during the time window.

* * * * *